Nov. 15, 1960   R. F. HERETH ET AL   2,960,009
LAUNCHER

Filed June 3, 1959   16 Sheets-Sheet 1

INVENTORS.
RALPH F. HERETH
RICHARD S. CHAMBERLIN
JOSEPH F. SAMPLE
BY

ATTORNEYS.

Nov. 15, 1960  R. F. HERETH ET AL  2,960,009
LAUNCHER
Filed June 3, 1959  16 Sheets-Sheet 2

INVENTORS.
RALPH F. HERETH
RICHARD S. CHAMBERLIN
JOSEPH F. SAMPLE
BY

ATTORNEYS.

Nov. 15, 1960 R. F. HERETH ET AL 2,960,009
LAUNCHER
Filed June 3, 1959 16 Sheets-Sheet 3
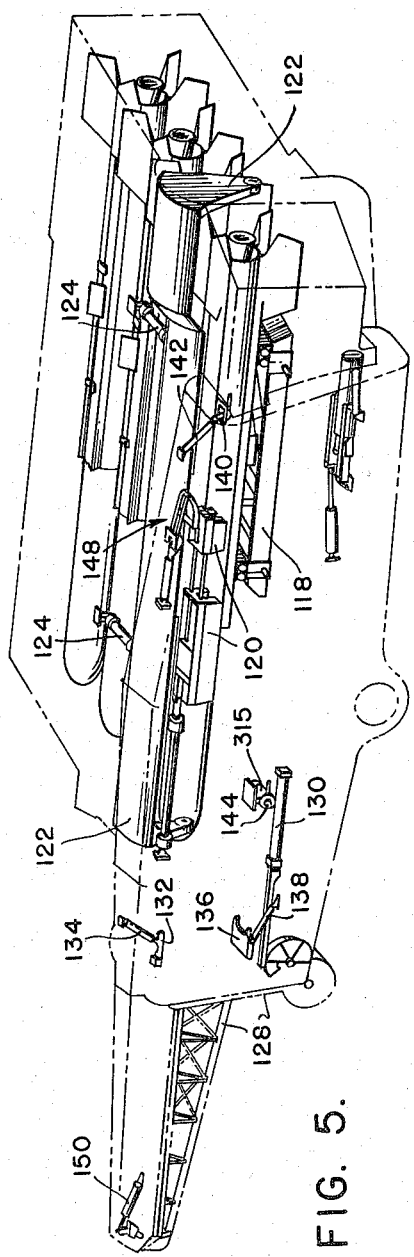
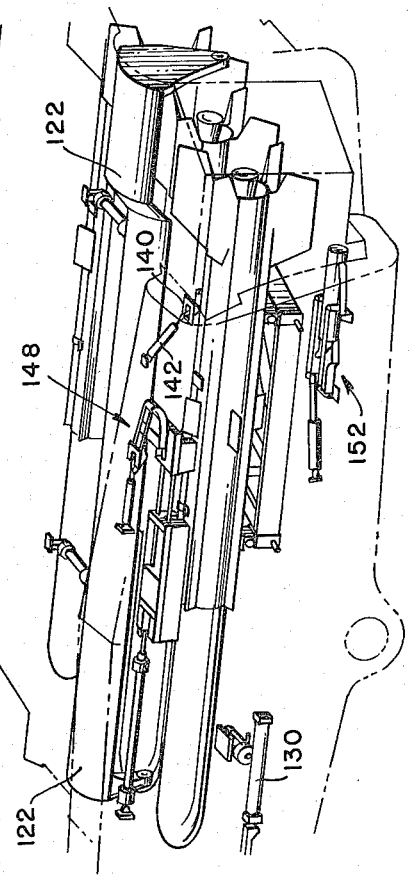
INVENTORS.
RALPH F. HERETH
RICHARD S. CHAMBERLIN
JOSEPH F. SAMPLE
BY
ATTORNEYS.

INVENTORS.
RALPH F HERETH
RICHARD S. CHAMBERLIN
JOSEPH F. SAMPLE

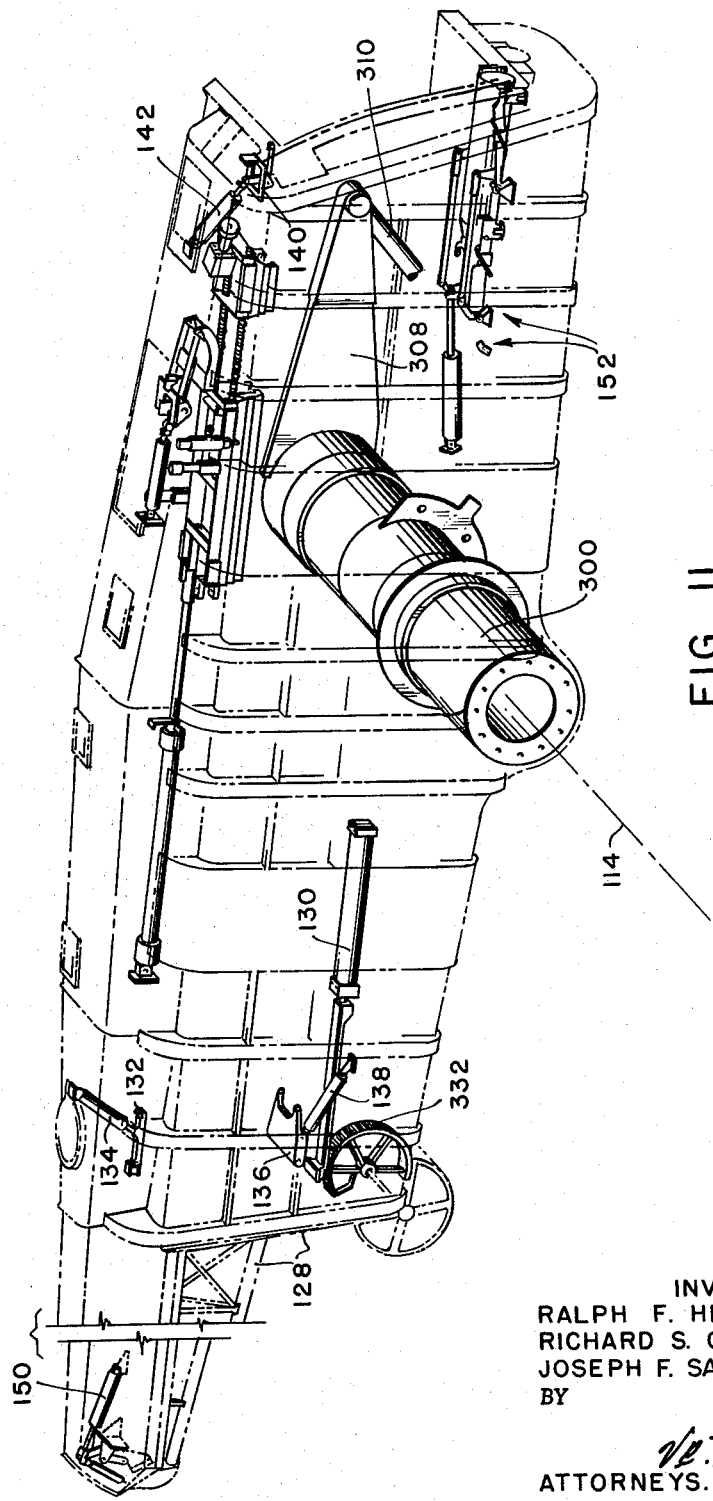

Nov. 15, 1960 R. F. HERETH ET AL 2,960,009
LAUNCHER
Filed June 3, 1959 16 Sheets-Sheet 7
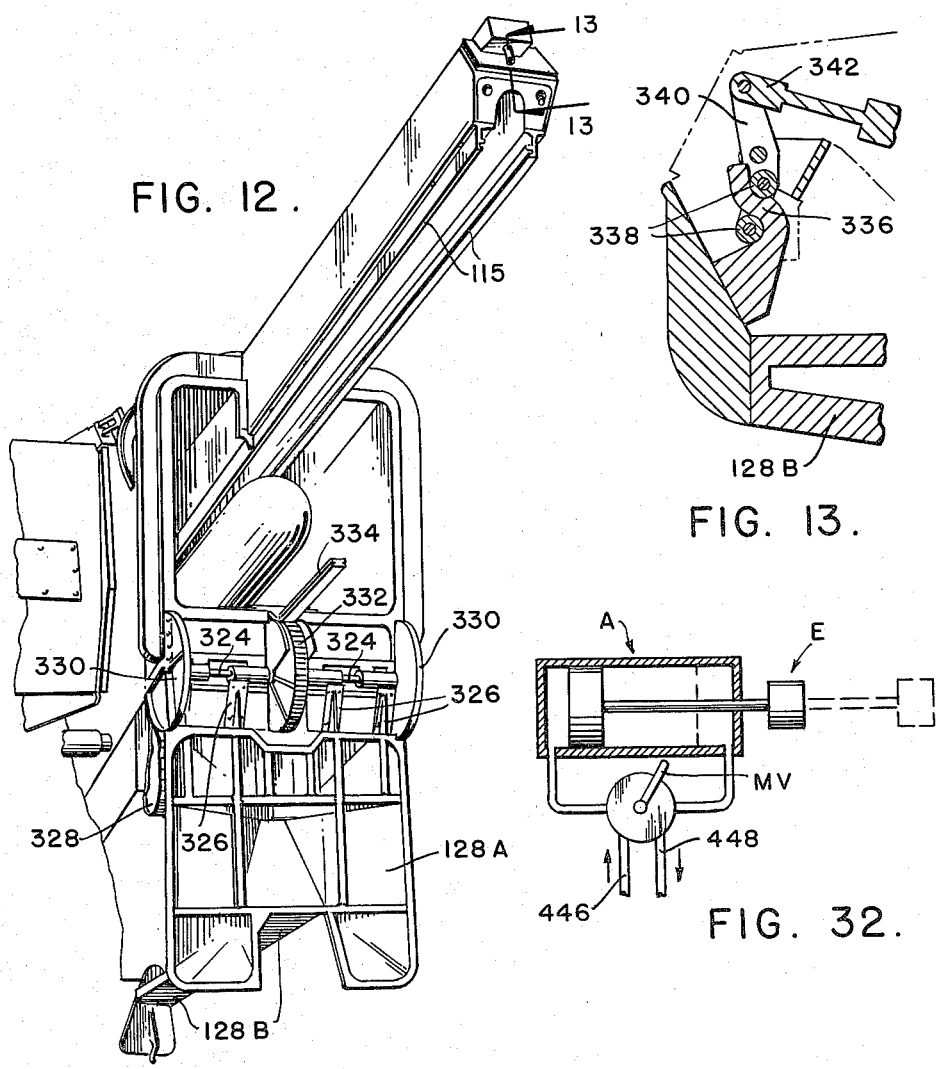
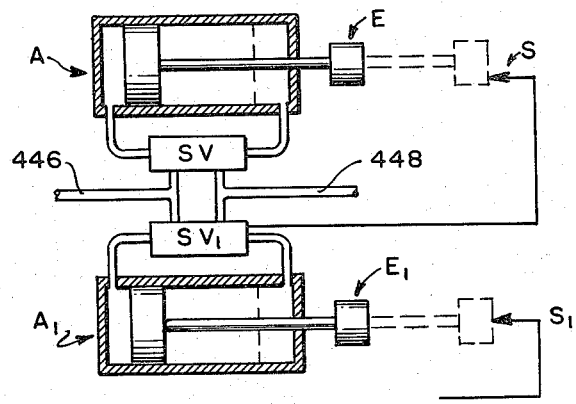
INVENTORS.
RALPH F. HERETH
RICHARD S. CHAMBERLIN
JOSEPH F. SAMPLE
BY
*J. E. Muller*
ATTORNEYS.

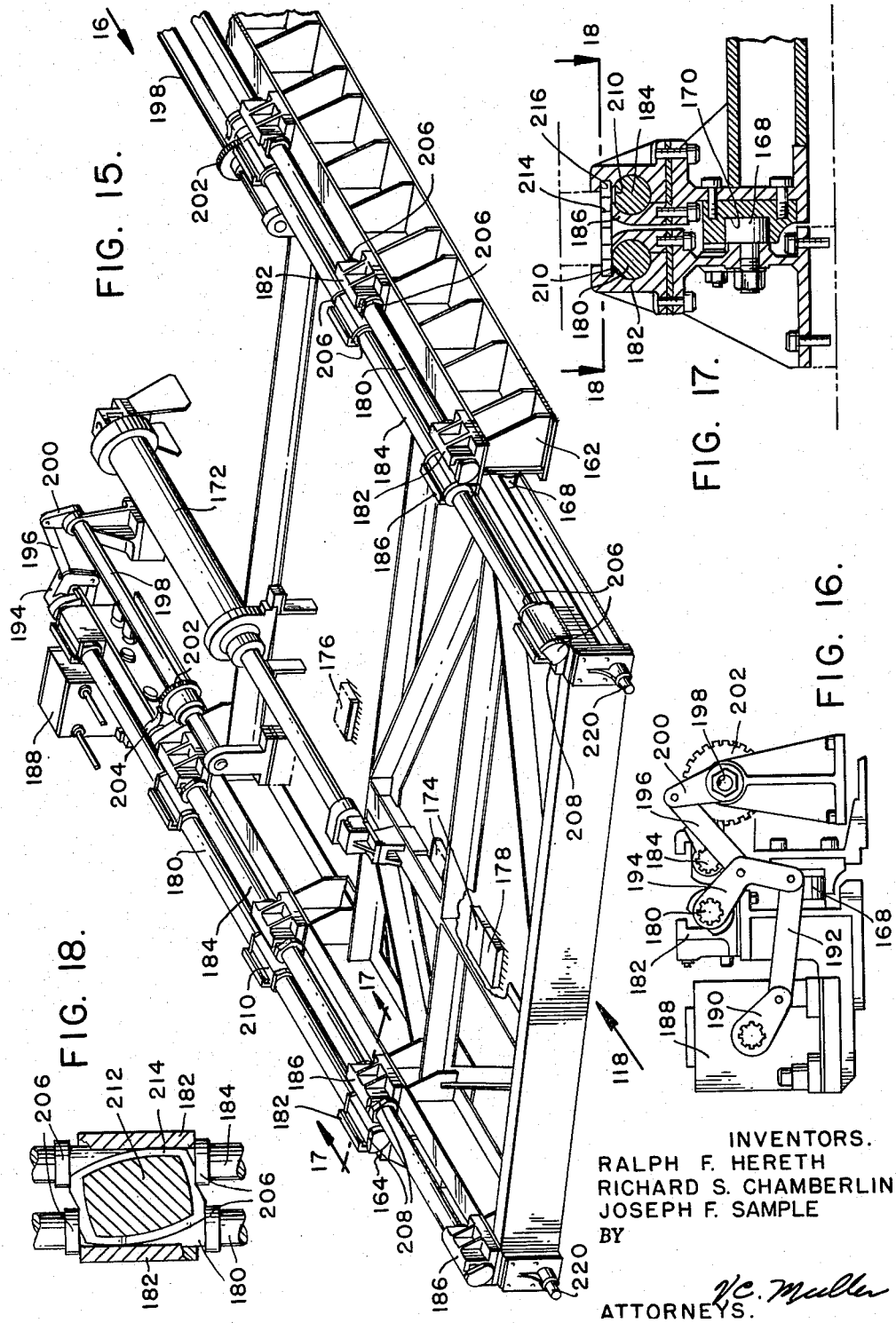

Nov. 15, 1960   R. F. HERETH ET AL   2,960,009
LAUNCHER
Filed June 3, 1959   16 Sheets-Sheet 10
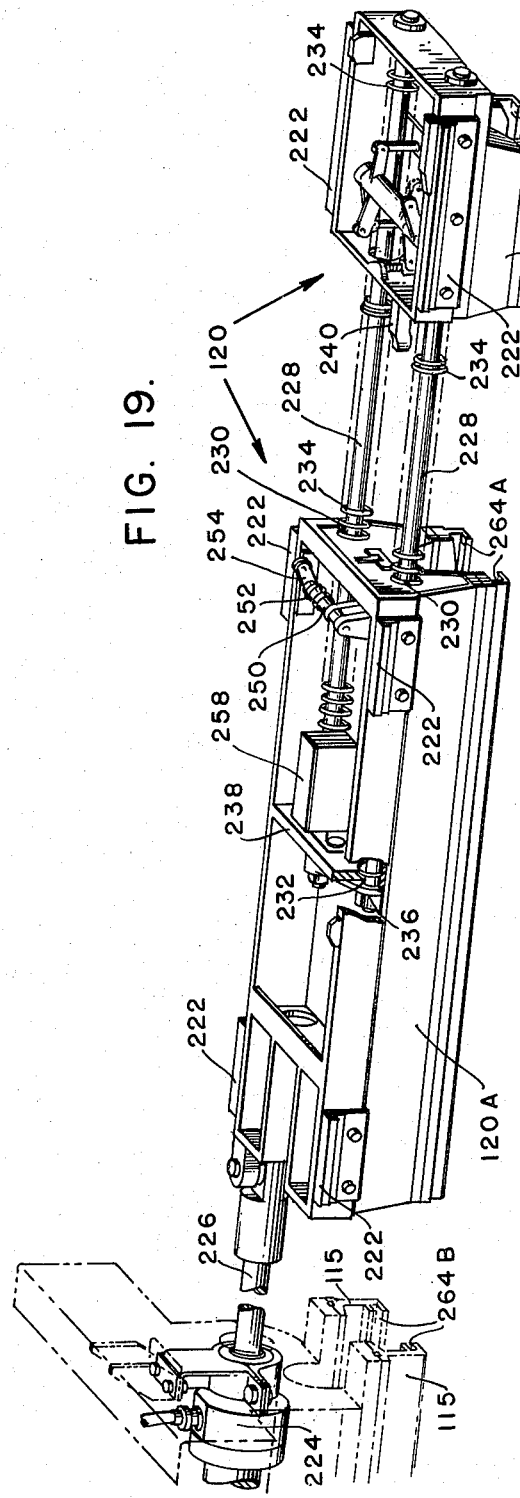
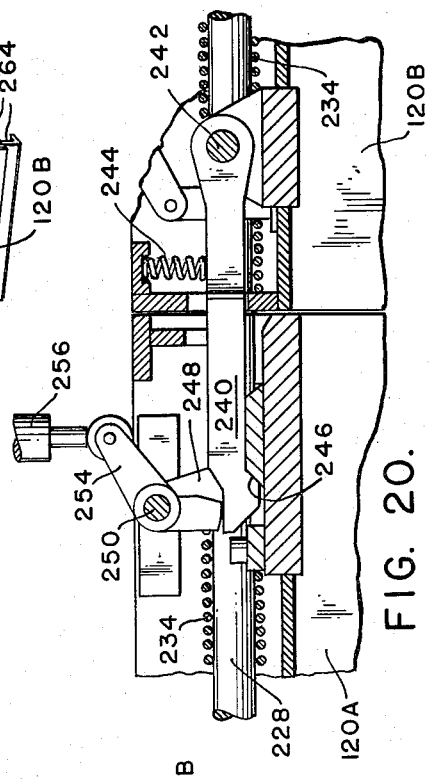
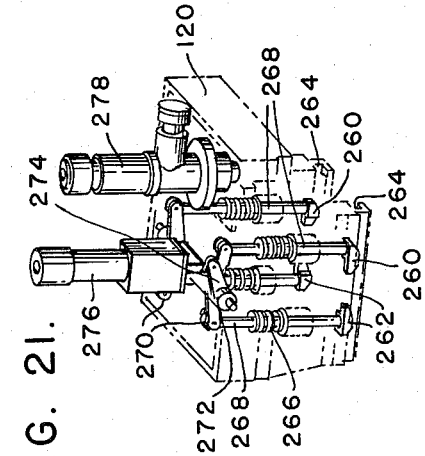
INVENTORS.
RALPH F. HERETH
RICHARD S. CHAMBERLIN
JOSEPH F. SAMPLE
BY
ATTORNEYS.

Nov. 15, 1960    R. F. HERETH ET AL    2,960,009
LAUNCHER
Filed June 3, 1959    16 Sheets-Sheet 11
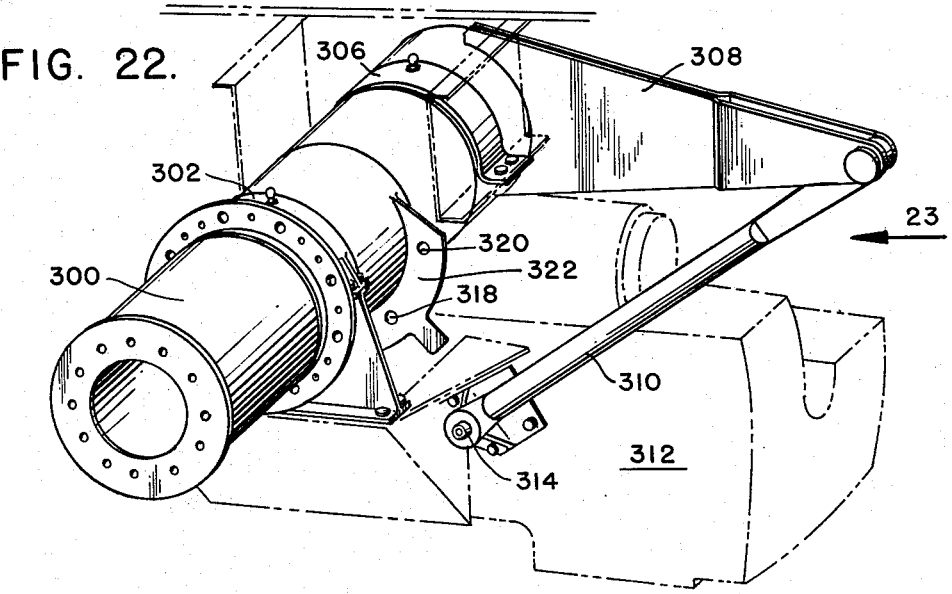
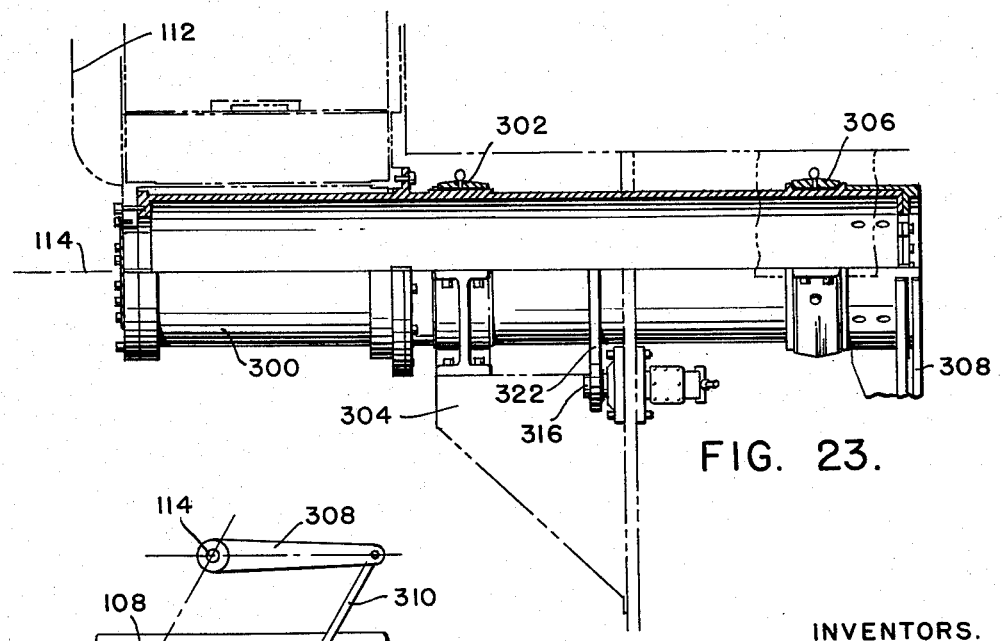
INVENTORS.
RALPH F. HERETH
RICHARD S. CHAMBERLIN
JOSEPH F. SAMPLE
BY
*V. E. Muller*
ATTORNEYS.

Nov. 15, 1960 R. F. HERETH ET AL 2,960,009
LAUNCHER
Filed June 3, 1959 16 Sheets-Sheet 12

INVENTORS.
RALPH F. HERETH
RICHARD S. CHAMBERLIN
JOSEPH F. SAMPLE
BY

ATTORNEYS.

Nov. 15, 1960 R. F. HERETH ET AL 2,960,009
LAUNCHER
Filed June 3, 1959 16 Sheets-Sheet 13

INVENTORS.
RALPH F. HERETH
RICHARD S. CHAMBERLIN
JOSEPH F. SAMPLE
BY

ATTORNEYS.

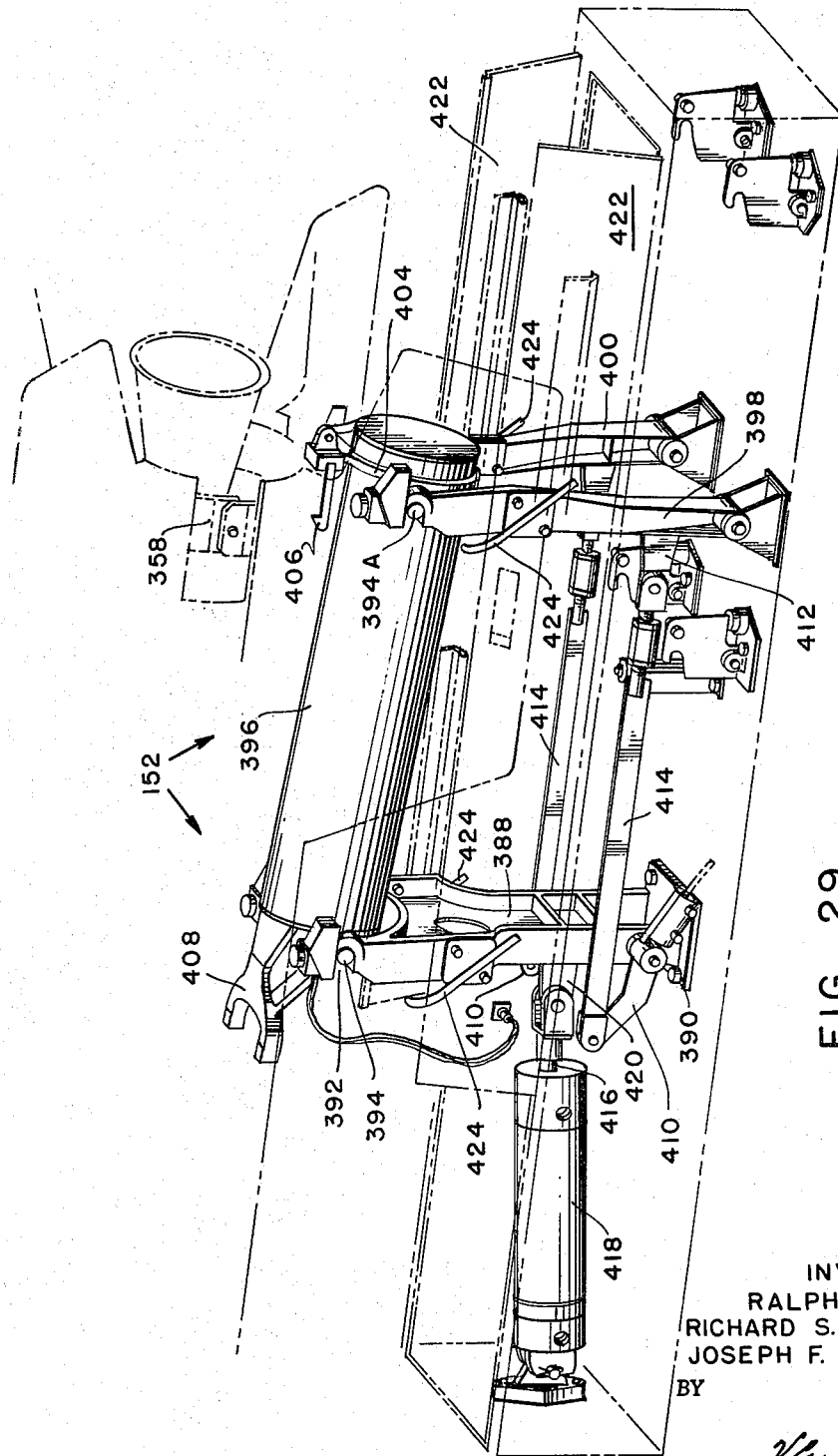

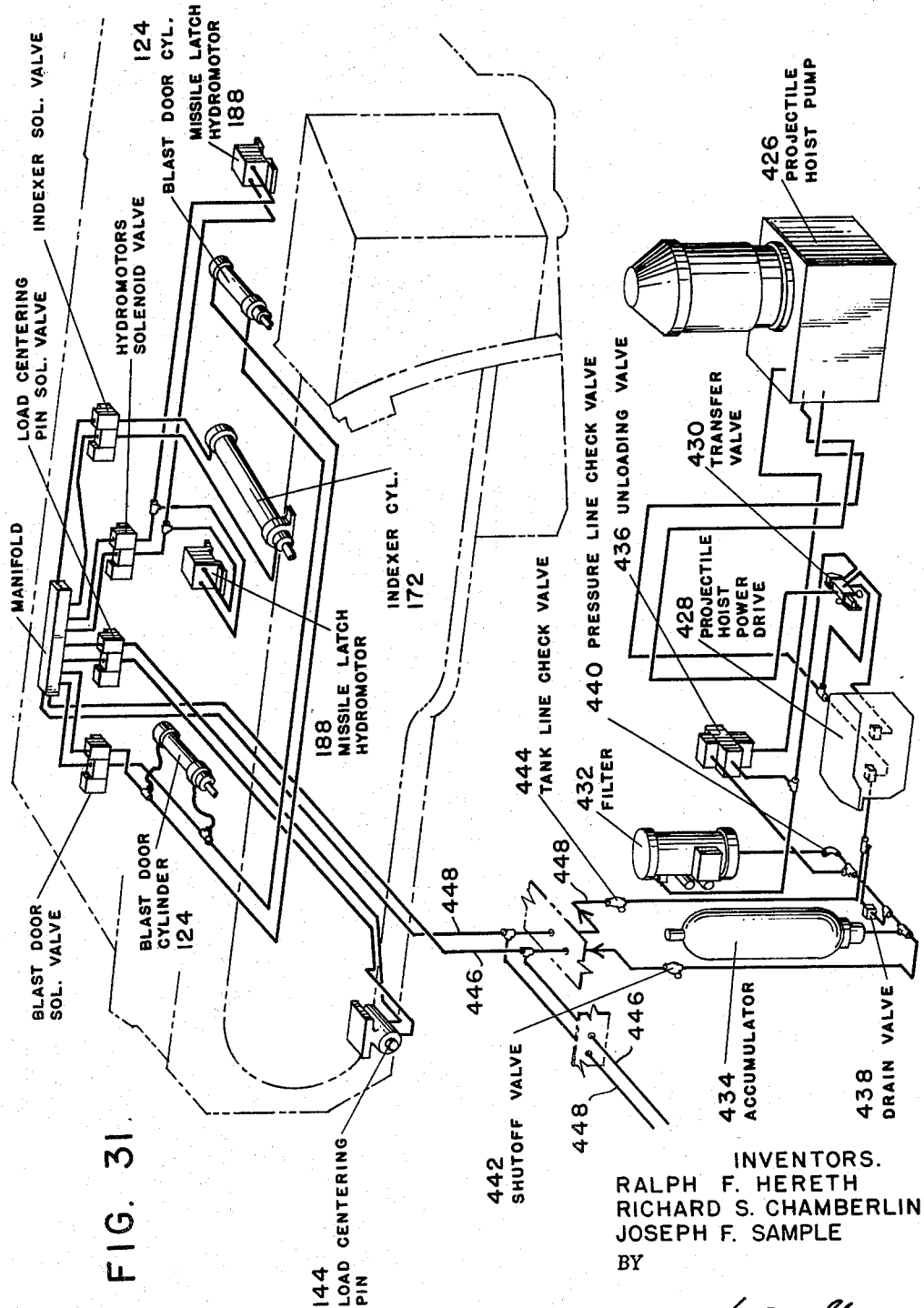

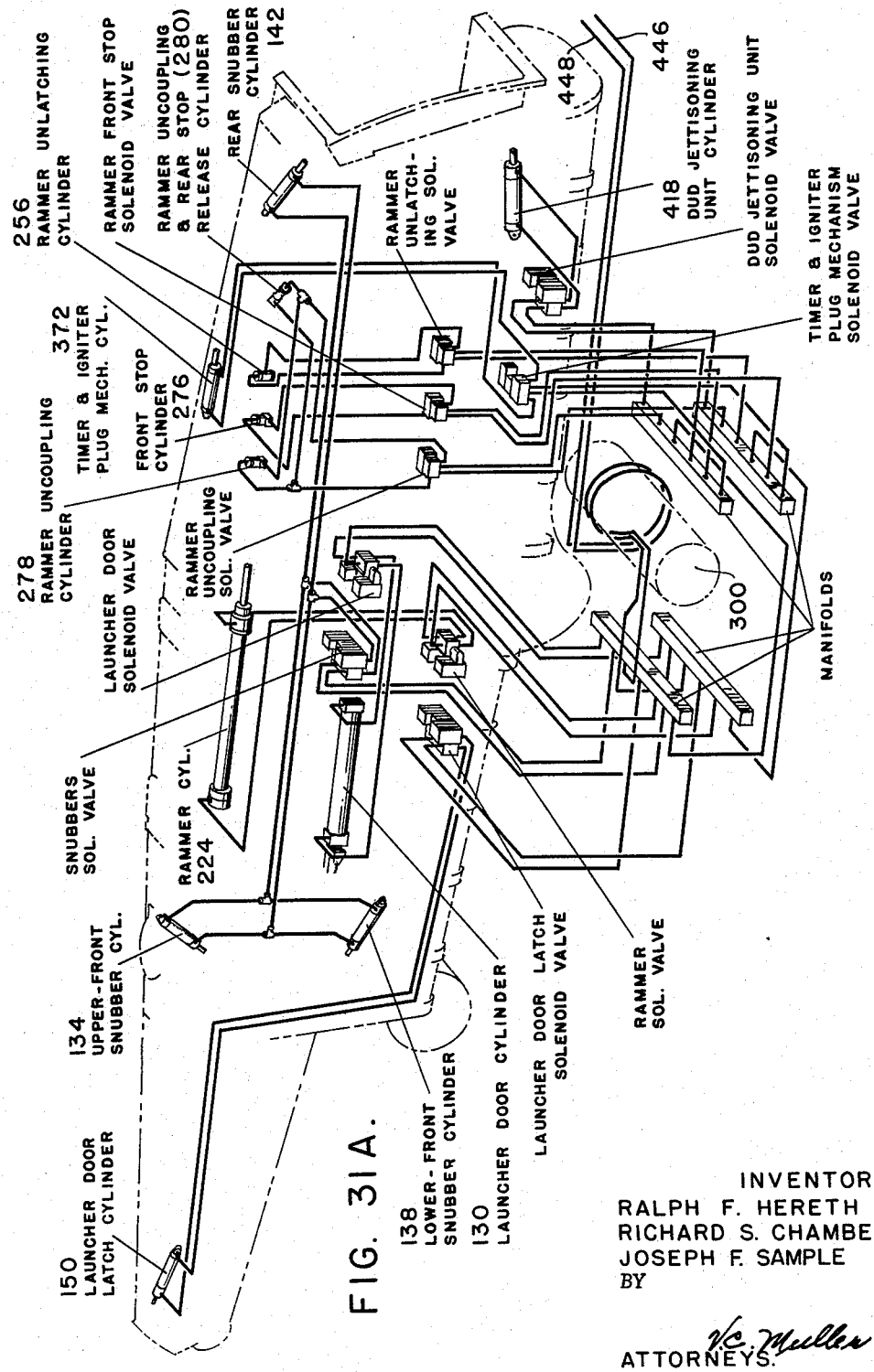

United States Patent Office 2,960,009
Patented Nov. 15, 1960

2,960,009

LAUNCHER

Ralph F. Hereth, Bremerton, Richard S. Chamberlin, Poulso, and Joseph F. Sample, Bremerton, Wash., assignors to the United States of America as represented by the Secretary of the Navy Filed June 3, 1959, Ser. No. 817,951

13 Claims. (Cl. 89—1.7)

(Granted under Title 35, U.S. Code (1952), sec. 266)

This invention relates to anti-submarine warfare missile systems and more particularly to apparatus for launching a submarine seeking missile from a surface ship.

Since the advent of sonar employed by both an attacking surface ship and a submarine target, the long used warfare tactics of destroying an enemy submarine by depth charges or other conventional weapons have become obsolescent, if not obsolete, due to improvements in modern submarines which have enabled them to run faster, deeper and more silently and thus more readily evade the weapons of an attacking surface ship. To increase the probability of destroying an enemy submarine after it has been detected by a surface ship a new weapon has been developed which can be launched at long distances through the air and into close proximity of the submarine thus, in effect, closing the range between surface ship and submarine but retaining the range between submarine and surface ship, thereby rendering the submarine more vulnerable to attack and the surface ship less vulnerable to counter-attack by submarine launched missiles.

The missile forming a part of the system referred to comprises, in general, a pay load at its forward end and a tandem airframe including a rocket motor for projecting the pay load through the air the major portion of the distance between the surface ship and the submarine. In the trajectory, which may be varied in distance as desired, the rocket motor propels the pay load a desired distance after which it and the airframe become detached from the pay load which continues in its air trajectory, checked to permissible water entry velocity by a parachute, which detaches from the torpedo at water entry. The pay load, which may be a homing torpedo, is then self propelled to the submarine target in any conventional search pattern. This missile is described in detail in the copending application of Harold G. Johnson et al., Serial No. 790,976, filed February 3, 1959, and is now known as a Rocket Assisted Torpedo (RAT).

One of the objects of this invention is to provide a shipboard rocket propelled missile launcher of the repeating type which utilizes existing armament for the support, aiming and launching of the missile.

Another object is to provide a launcher in accordance with the preceding object which is supported by a gun turret and aimed in elevation and azimuth by existing gun turret and other mechanism.

Another object is to provide a launcher in accordance with the preceding object which may be employed when desired without affecting the normal use of the turret guns for firing gun projectiles.

Still further objects, advantages and salient features will become apparent from the description to follow, the accompanying claims and the appended drawing, in which:

Fig. 5 is an enlarged phantom view of a portion of Fig. 2 showing the general arrangement of parts of the right side launcher;

Fig. 6 is an enlarged view of a portion of Fig. 5;

Figs. 7 to 11 are views like Fig. 6 showing various arrangements of parts;

Fig. 12 is a front perspective of the right side launcher;

Fig. 13 is an enlarged section taken on line 13—13, Fig. 12;

Fig. 15 is an isometric view of an indexer mechanism;

Fig. 16 is an enlarged detail of a portion omitted from Fig. 15 as viewed in the direction of arrow 16;

Fig. 17 is an enlarged section on line 17—17, Fig. 16;

Fig. 18 is a detail of Fig. 15 illustrating a portion of a missile engaged by the indexer;

Fig. 19 is an isometric view of a missile rammer car;

Fig. 20 is a vertical section through a portion of Fig. 19 with the rammer car coupled;

Fig. 21 is a detail of Fig. 19, portions being shown in phantom;

Fig. 22 is an isometric detail of a launcher housing torque tube and its actuating gun slide shown in phantom;

Fig. 23 is a rear elevation of Fig. 22, as viewed in the direction of arrow 23, portions being shown in section;

Fig. 24 is a geometric illustration of the linkage system of Figs. 22 and 23;

Fig. 29 is an isometric detail of a dud jettisoning device;

Figs. 31 and 31A collectively diagrammatically illustrate a hydraulic system; and Figs. 32 and 33 diagrammatically illustrate highly simplified control apparatus.

General description (Figs. 1 to 14)

The existing gun mount referred to previously and to which the present invention is an attachment, is disclosed as a 5 inch 38 calibre twin gun turret as employed on a certain class of U.S. Navy destroyers, the turret having conventional power means for rotating the turret in azimuth and for elevating the guns. The term "launcher" will hereafter be understood to mean a complete launching attachment for a turret including a missile magazine, a launcher rail and its supporting housing, apparatus for indexing missiles from the magazine to the launcher rail and various other ancillary equipment or such attachment in combination with the turret. The launchers are identical except for right and left hand characteristics, hence a description of one, the right hand unit, will serve for both. Since the turret may be rotated to various positions in which the guns point laterally of the ship, as well as rearwardly, the term "forward," or "front" regardless of the actual orientation of the turret, will be understood to mean the axial direction in which a missile is launched which will be parallel with the gun barrel axes. "Horizontal" and "vertical" are to be understood as having their usual meanings with the ship assumed to be at rest without list, roll or pitch.

Figure 1:
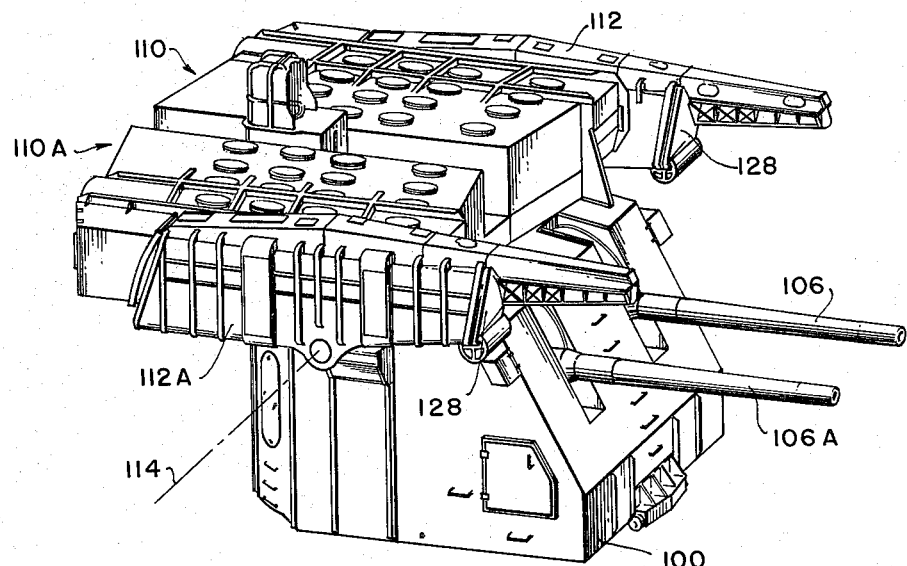
Fig. 1 is a perspective of an existing destroyer gun turret incorporating the subject of the invention. For purposes of orientation it will be assumed that this is a rear turret with guns trained directly astern, and as viewed from the left side of the ship.
Figure 2:
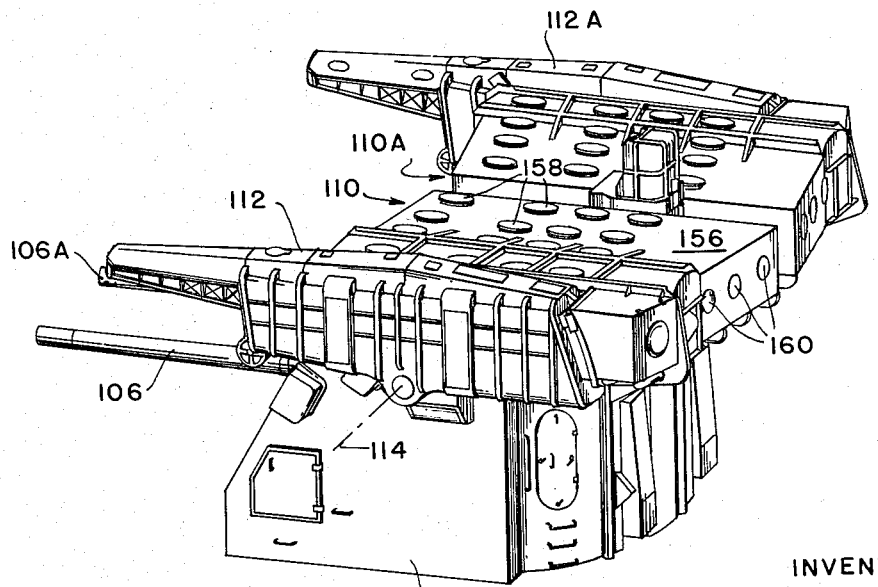
Fig. 2 is a similar perspective, as viewed from the right side of the ship.
Figure 3:
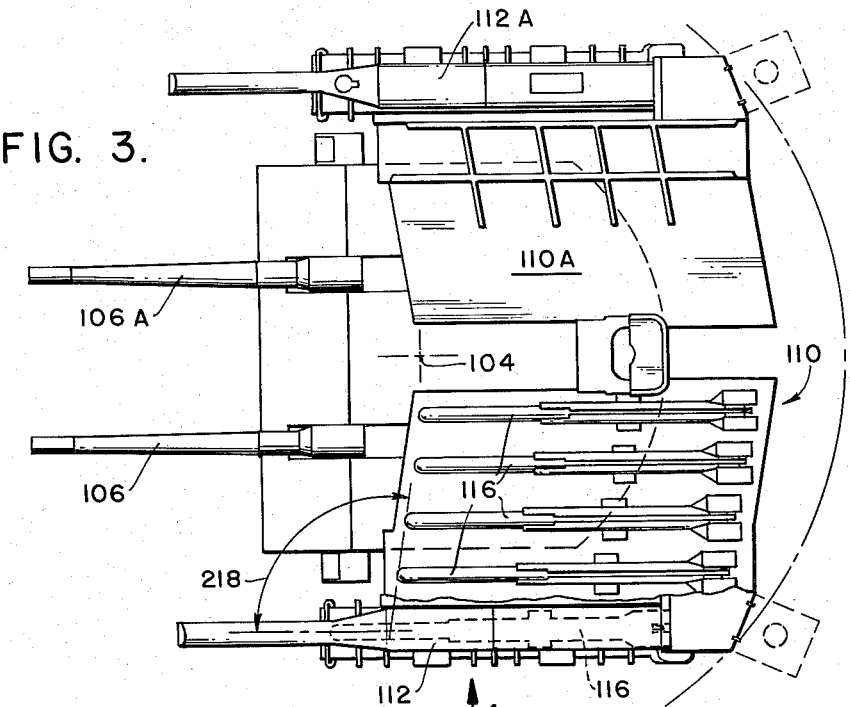
Fig. 3 is a top plan of Figs. 1 and 2.
Figure 4:
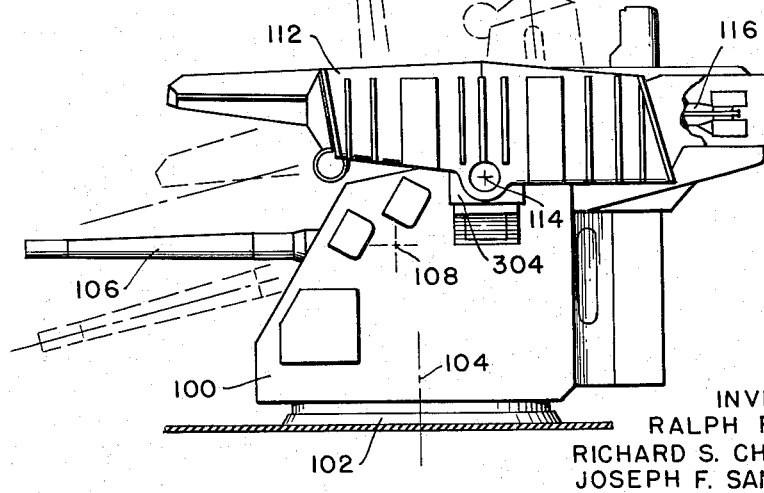
Fig. 4 is a side elevation of Fig. 3 as viewed in the direction of arrow 4 from the right side of the ship, a portion being broken away.

As previously referred to, turret 100 is of conventional construction mounted on a suitable support 102 and pivoted for rotation about vertical axis 104, the turret having a pair of guns 106, 106A pivotally carried by the turret for movement about a horizontal axis 108. Right and left magazines 110, 110A are secured to the top of the turret and bodily rotate with it about vertical axis 104. Launcher rail housings, supports or guides 112, 112A are mounted for rotation about horizontal axis 114, and when mechanically linked to portions of the gun elevating mechanism may be elevated or lowered with the guns, as illustrated in dotted lines, Fig. 4, to thereby elevate or lower the launcher rail 115 (Figs. 12, 19) affixed to such supports. As best shown in Fig. 3, each magazine carries four missiles 116. An additional missile, as shown in dotted lines, may be carried within a launcher rail housing, guide or support whereby the two launchers may carry a total of ten missiles. As will more fully appear hereinafter, the magazine is provided with a mechanism for retaining the four missiles in spaced relationship including a reciprocable carriage 118 of an indexer (Fig. 5) which conjointly moves all missiles, one missile spacing or module, toward the launcher rail housing when the latter is to be reloaded. A reciprocable rammer car 120 transfers the missile from the indexer to the launcher rail. After reloading and prior to launching of a missile a pivotally mounted arcuate blast door 122 operated by actuating cylinders 124, 124 closes, preventing blast from the missile being launched from entering the magazine. Prior to launching, a pivotally mounted launcher door 128, operated by actuating cylinder 130, is opened to permit egress of the missile from its supporting rail. Other ancillary apparatus forming a part of each launcher rail support, to be subsequently described in detail, comprises upper front snubber 132 operated by actuating cylinder 134, lower front snubber 136 operated by actuating cylinder 138, rear snubber 140 operated by actuating cylinder 142, load centering pin 144, timer and ignition plug mechanism 148, launcher door latch cylinder 150, dud jettisoning unit 152 and front stops 262 (Fig. 21).

Figure 14:
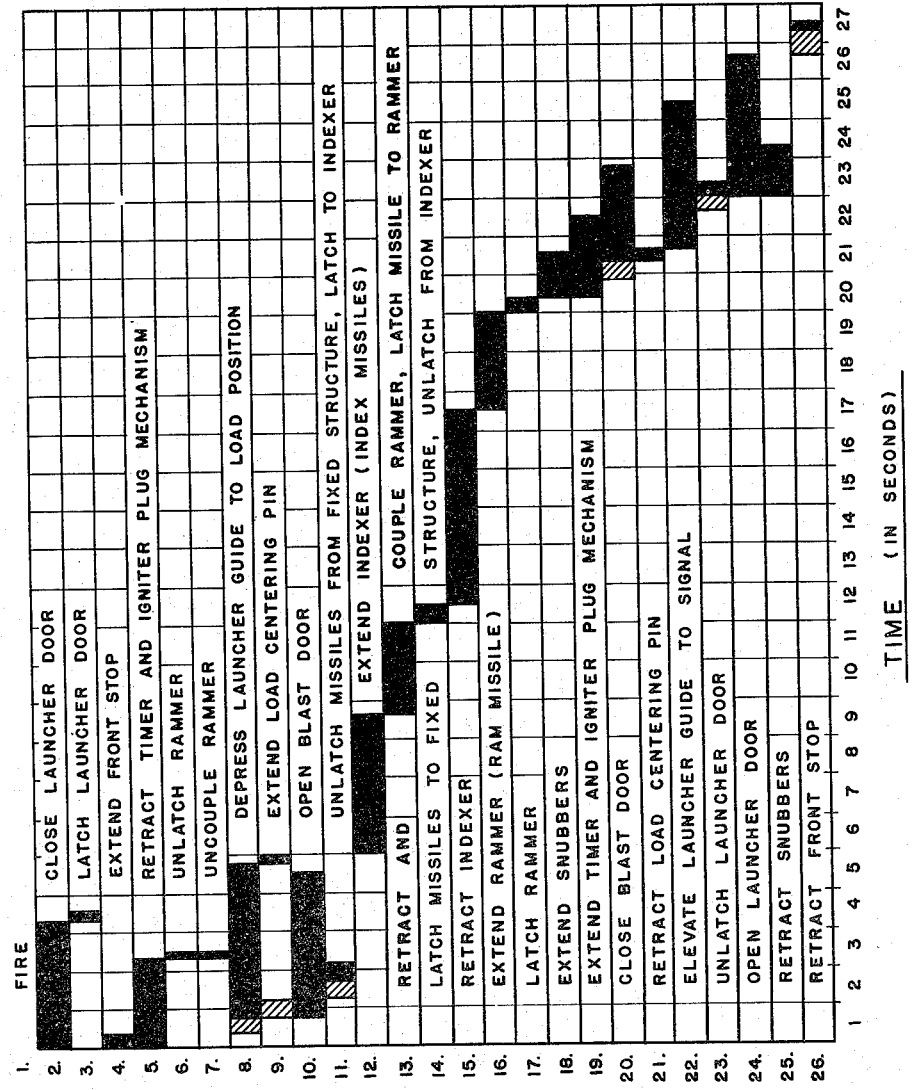
Fig. 14 is a time chart of sequence of operation of the various components.

Before proceeding with the detailed description of the various components reference is now made to self explanatory Fig. 14 which shows the sequence of operations of the apparatus, a general understanding of which at this stage of the description will render more readily understandable that which is to follow.

*Magazine and indexer (Figs. 1, 2, 15, 16, 17, 18)*

Each magazine 110, 110A comprises a metallic shield or casing 156 of welded plate construction fixed to the top of the turret which houses an indexer. The top plate is provided with access hatches 158 through which adjustments and servicing of the missiles may be made, each rear plate having blow-out plates 160 which are aligned with the rocket motor propulsion nozzles of the missiles housed within the magazine.

Each indexer comprises a pair of parallel side rails 162, 164 affixed to the top of the turret which slideably support carriage 118 in machine guideways, such as spaced rollers 168 engaging mating grooves 170 in the side rails of the carriage. An indexer actuating cylinder 172 reciprocates the carriage between fixed limits as determined by a stop lug 174 on the carriage which engages fixed carriage stops 176, 178. A fixed structure latch rod 180 is journaled on each side rail in spaced bearing segments 182 and a similar carriage latch rod 184 is journaled in spaced bearing segments 186 supported by each side rail of the carriage. An oscillating vane type hydromotor 188 for operating each pair of latch rods, each having an actuating lever 190, connected by a link 192 to a bell crank 194 affixed to latch rod 180, rotates rod 180 through predetermined limits of movement. A link 196, pivoted to the bell crank, rotates a splined shaft 198, through lever 200 affixed to shaft 198, such shaft being journaled on the fixed structure. Shaft 198 slideably carries a gear 202 which meshes with a sector gear 204 affixed to one end of latch rod 184. Gear 202 may be shrouded to sector gear 204 or yoked to latch rod 184 in any suitable manner such that gear 202 remains in mesh with the sector gear as adjacent latch rods translate relatively. Each latch rod, where it engages a segmental bearing, is provided with collars 206 adjacent opposite ends of a segmental bearing which have chordal cutaways 208 aligned with chordal cutaways 210 on the shaft portion journaled in the segmental bearings. Each missile is provided with a pair of longitudinally spaced missile loading lugs 212 affixed to its lower surface which are either locked to each fixed structure latch rod or to each carriage latch rod. Each lug is generally inverted T-shaped having curved oppositely projecting flanges 214 which engage in slots 216 in the bearing segments. When the chordal cutaways on a shaft and its flanges are directly upward flanges 214 are free to slide longitudinally out of the slots in the bearing in which such shaft is journaled and similarly when the chordal cutaways are at any other position the flanges are locked against movement. Flanges 214 are curved, as best shown in Fig. 18, and opposite ends are shaped as shown so that the flanges may properly slide through adjacent slots 216, the longitudinal axes of which are disposed at an angle 218 to the longitudinal axis of a launcher rail as shown in Fig. 3. Tapered aligning pins 220 on one end of the carriage enter corresponding apertures in the launcher rail housing when the carriage is extended and a missile is to be transferred from the carriage to its loaded position on the launching rail. Assuming now that each magazine is loaded with its four missiles and collars 206 on fixed structure latch rods 180 are in a position such that they lock the missiles against motion, the hydromotors 188, 188 now synchronously start rotating all latch rods, rotating the carriage latch rods toward latching position and the fixed structure latch rods away from latching position. At an intermediate position of rotation the missiles are latched to both latch rods and upon further rotation are released from the fixed structure latch rods and remain latched to the carriage latch rods. This is operation 11 of Fig. 14. Actuator cylinder 172 now moves carriage 166 which moves one missile into the launcher rail housing and indexes the other three missiles one module toward the launcher rail housing. This is operation 12. After operation 13 takes place, to be subsequently described, the hydromotors in operation 14 now rotate toward their original positions, latching the three remaining missiles to the fixed structure. Since the carriage latch rods now have no missiles latched to same the carriage may now be returned to original position by reverse operation of actuating cylinder 172. As will be apparent, this indexing may continue until all missiles are delivered from the magazine.

*Rammer (Figs. 19, 20, 21)*

It will now be assumed that a missile has been launched at an angle above the horizontal, operation 1, and the launcher rail now requires reloading from the magazine. It will also be assumed that operations 2 through 5 have occurred, which will subsequently be described in detail, and operations 6 through 17 are about to occur, certain of these having been previously described under "Magazine and Indexer." The rammer 120 comprises front rammer car 120A and rear rammer car 120B which are mounted for longitudinal sliding movement parallel to the guide rail on machine guides 222 which mate with grooved guides (not shown) which are affixed to the launcher rail housing. A hydraulic cylinder 224, affixed to the launcher rail housing operates rammer cars 120A, 120B by a piston rod 226 affixed at its outer end to the forward end of rammer car 120A. The rear rammer car is coupled to the front rammer car by a pair of rods 228, affixed at their rear ends to the rear car and extending through spaced apertures 230, 232 in the front car, springs 234 surrounding the rods, urging the rear car rearwardly relative to the front car and a plate 236, extending between the front ends of the rods and abutting a stop plate 238 on the front car, limiting this relative movement. When the cars are moved relatively into abutting relationship a latch 240 pivoted on pin 242 carried by the rear car and urged downwardly by spring 244 engages a latching surface 246 on the front car. A cam 248, carried by a pivoted rod 250, urged counterclockwise by torsion spring 252, engages the top surface of the end of the latch rod and prevents the latch rod from moving upwardly. To release the latch rod, arm 254, secured to rod 250, is depressed against the urge of spring 252 thus permitting the latch to disengage and permit springs 234 to urge the cars relatively away from each other. Arm 254 is depressed by a hydraulic actuator 256 affixed to the launcher rail housing at a position above the front rammer car and at a position of its travel where the upper end of the arm is directly beneath the actuator. To cushion the shock when the rear car moves away from the front car and to its rearward limit a buffer 258 is provided on the front car which is engaged by a collar or the like carried by one of rods 228. Since the buffer may take any form desired and forms no part of the invention per se, details have been omitted in the interests of simplifying the disclosure.

Rear car 120B is provided with a pair of missile lug rear stops 260 and a pair of front stops 262 which have front and rear cam surfaces disposed in the path of confronting grooves 264 which form an extension of grooves 264A in the front car and grooves 264B in launcher rail 115. Springs 266 urge these stops downwardly to a limit position but permit them to move upwardly when a missile is to be transferred from the indexer to the missile guide rail. All stops are affixed to rods 268 and the front rods are pivoted at their upper ends to levers 270 affixed to a shaft 272 having an arm 274 thereon which may be depressed by a hydraulic actuator 276 to thereby lift the front stops out of grooves 264. A rammer car latching cylinder 278, having a suitable plunger adapted to engage an aperture in the top of the rear car positively locks the entire rammer in extended position. It will now be assumed that the rear car is latched in abutting relation to the front car and the front car is abutting the rear end of launcher guide rail 115, thus forming a continuous launching guide rail from the front end of guide rail 115 to the rear end of the rear car. The missile lugs, which are T-shaped in cross section, similar to the lower lugs 212, are now disposed within this continuous guide. It will also be assumed that actuator 276 has been operated, operation 26, lifting the front pair of stops. The launcher rail is now in elevated position and this missile is fired, operation 1, the missile being guided along the rail toward its target. It will also be assumed that operations 2 and 3 have occurred and actuator 276 has been operated to permit front stops 262 to return to their positions within grooves 264. It will be further assumed that operation 5, to be subsequently described, has occurred and actuator 278 is operated, operation 6, permitting the rear car to move rearwardly. Actuator 256 is now operated, operation 7, to release latch 240 and uncouple the rear car from the front car under urge of springs 234. The rear and front cars are now separated as shown in Fig. 19 but the front car is still in abutting relation with the rear end of rail 115. It will now be assumed that operations 8 to 12 have occurred and a missile has been indexed to a position within the launcher rail housing, as previously described. At this point of operation the front missile launching lug is now disposed between the front and rear car and the rear lug is disposed rearwardly of the rear car. Actuator 224 is now operated, operation 13 moving both cars rearwardly. The front missile lug now enters the rear end of grooves 264A and at a subsequent point of rearward travel of the two cars the rear car passes over the rear lug, its lateral flanges passing beneath rear stops 260 thus being captured between the front and rear pairs of stops. The rear car next abuts a fixed limit stop and upon further rearward movement of the front car it moves into abutting relation with the rear car, compressing springs 234 and latching the two cars together with latch 240. The missile is then unlatched from the extend indexer and the remaining missiles in the magazine latched against movement by the pairs of latch rods and the indexer is retracted. Actuator 224 is now operated in the reverse direction, operation 16, carrying the missile forwardly and closing the gap between the front car and rear end of launcher rail 115. The rear car is then latched by actuator 278, operation 17, and after the sequence of operations 18 through 26 the missile is ready to be fired.

*Launcher housing elevating mechanism (Figs. 4, 5, 11, 22, 23, 24)*

As previously referred to, the turret guns rotate about horizontal axis 108 and the launcher housings rotate about horizontal axis 114. Each launcher housing has rigidly affixed thereto a torque tube 300 journaled in a bearing 302 carried by a bearing support 304, attached to the side of the turret and a bearing 306 supported by rigid frame work within the turret, the torque tube having a rearwardly extending torque arm 308 affixed thereto which is connected by a link 310 pivoted to the arm and to the gun-slide 312 by a removable pivot pin 314. The relationship of the axes of the four pivot axes, as best shown in Fig. 24, is such that they form a parallelogram linkage which effects equal angles of elevational movement of the gun and launcher housing. When gun firing is desired, rather than missile launching, pin 314 is removed thus permitting the gun to be elevated independent of the launcher housing. The range of elevation of the guns and launcher housings may be varied between $-15°$ and $+85°$ as illustrated by dotted line positions in Fig. 4. Normally each launcher housing is stowed at 0° elevation by load centering pin 144 (Fig. 5) which is operated by a hydraulic cylinder 315, the pin entering a suitable mating aperture in the launching housing. A similar stowage pin 316, engageable in apertures 318, 320 in stow flange 322 affixed to the torque tube, permits stowing the launcher housings at 25° and 70° elevation when so desired.

*Launcher door (Figs. 12, 13)*

Launcher door 128 serves the purpose of closing the forward end of the launcher housing an enclosing the forwardly portion of the launcher rail to prevent entry of sea spray into the launcher housing at all times except when a missile is to be launched. Door 128 comprises two parts, 128A and 128B, the former closing the forward end of the launcher housing and the latter enclosing the launcher rail. The door is pivotally connected to the launcher housing by a hinge pin 324 extending through axially spaced hinge leaf plates 326 secured to the door and launcher housing. The hinge mechanism is protected against spray by a flexible corrugated sheet member 328, one end of which is affixed to the launcher housing and the other to the door. Segmental circular fixed plates 330 are affixed to the launcher housing about which the side edges of the sheet member are adapted to be trained and thus prevent entry of sea spray at the side edges. A segmental gear 332 is affixed to the hinge pin which engages a rack 334 which may be reciprocated between suitable limits by actuating cylinder 130. As best shown in Fig. 13, door part 128B is provided with a hook-like projection 336 which is engaged by rollers 338 carried by one end of a lever 340, the other end of the lever being connected by piston rod 342 to launcher door latch cylinder 150. After launcher door cylinder 130 moves the door to closed position, launcher door latch cylinder 150 is actuated which positively latches the door in closed position.

Figure 8:
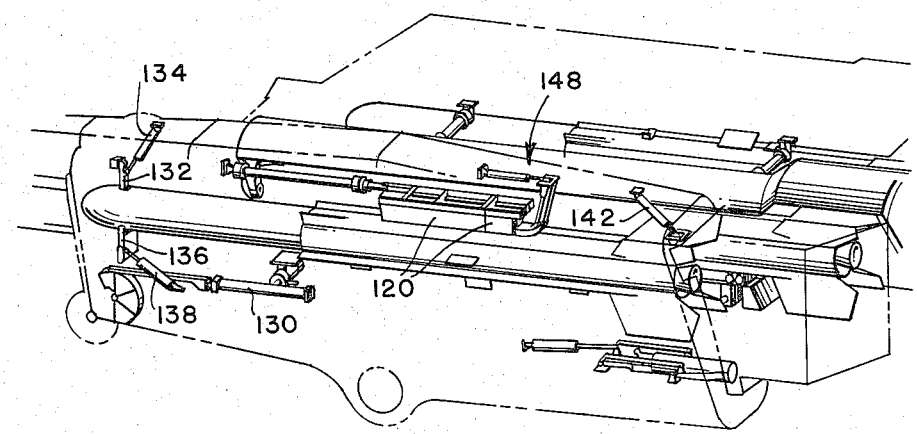
Figure 25:
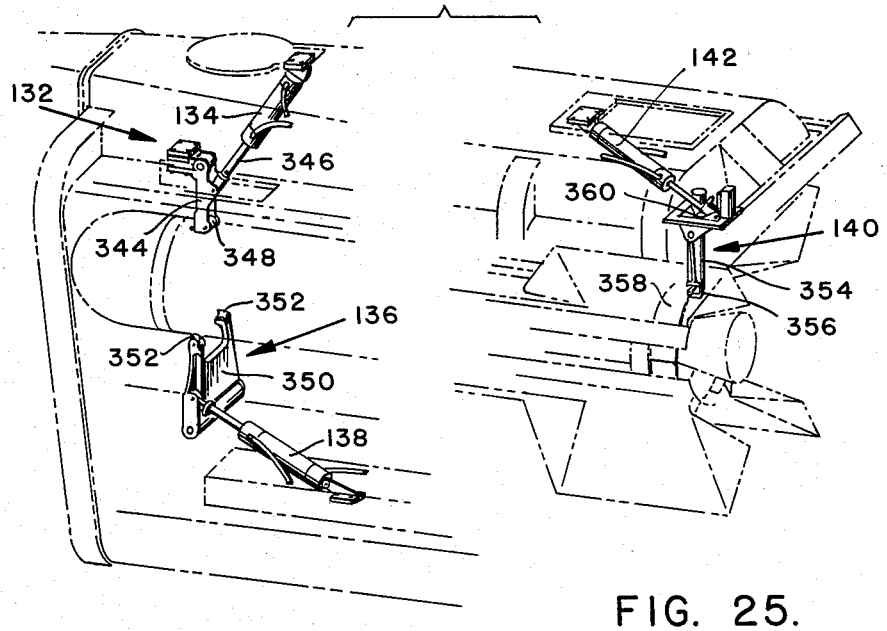
Fig. 25 is an isometric detail of missile snubbers.

Snubbers (Figs. 5, 8, 25)

Fig. 5 illustrates upper front snubber 132, lower front snubber 136 and rear snubber 140 in retracted positions wherein they are out of engagement with the missile disposed in the launcher housing and Figs. 8 and 25 illustrate the positions of the snubbers in extended positions in engagement with the missile. When in the former position missiles may be indexed and transferred from the magazine to the launcher housing and when in the latter position a missile is more rigidly supported in the launcher thus relieving strains on the missile launching lugs which result from vibration and various movements of the ship. Fig. 25 illustrates the snubbers in greater detail. Upper snubber 132 comprises a bifurcated arm arm 344 pivoted at its upper end to the launcher housing and pivotally connected to one end of piston rod 346, forming a part of actuating cylinder 134, also pivotally connected at one end to the launcher housing. A concave roller 348 is pivotally carried at the lower end of the arm which engages the missile. Lower snubber 136 is of similar construction except that arm 350 is yoke shaped and carries similar angularly spaced rollers 352. Thus, the rollers of the front upper and lower snubbers form a rigid three point support for the missile. Rear snubber 140 is similar to the upper front snubber but its arm 354 instead of carrying a roller, is provided with a notched lower end 356 which engages about the rear edge of a ring 358 forming a part of the missile. Any suitable spring loaded detent 360 may be employed to resiliently engage the linkage system and lock the arm in extended position, it being understood that cylinder 142 may override this lock when the rear snubber is to be retracted.

Timer and igniter plug mechanism (Figs. 7, 8, 26, 27)

Figure 7:
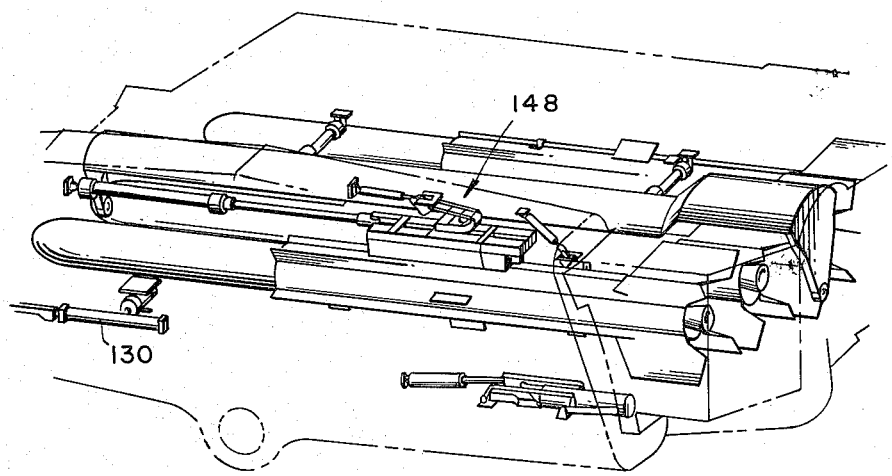
Figure 26:
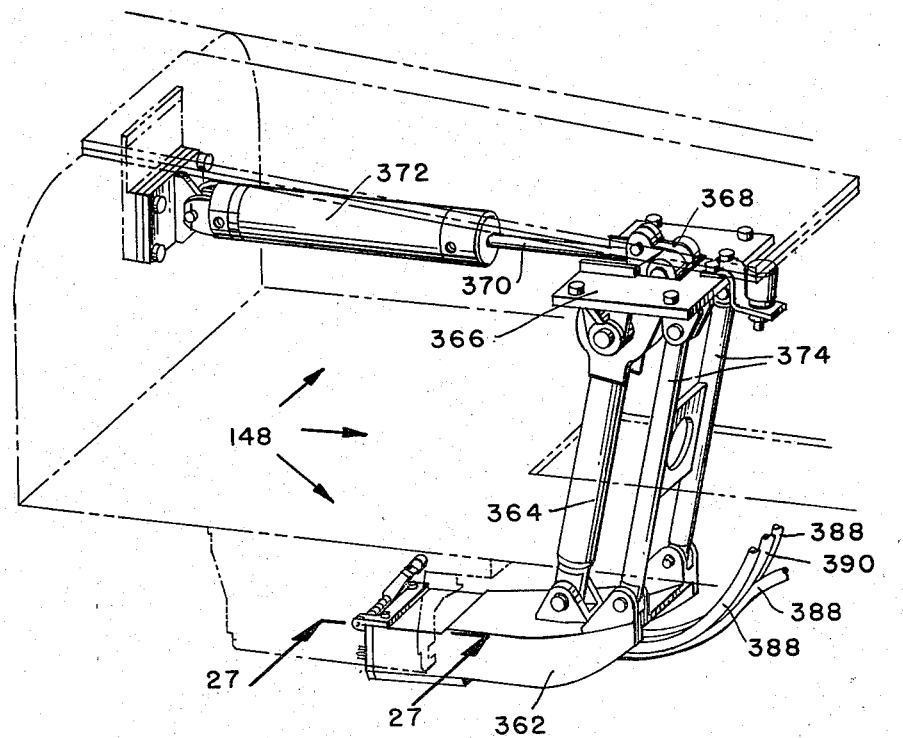
Fig. 26 is an isometric detail of a timer and igniter mechanism.
Figure 27:
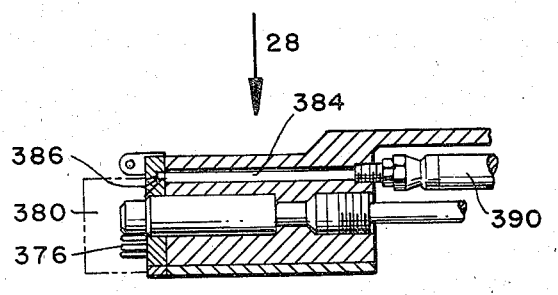
Fig. 27 is a section taken through line 27—27, Fig. 26.
Figure 28:
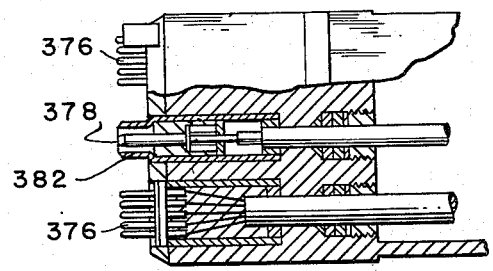
Fig. 28 is a top plan of Fig. 27, portions being broken away.

The purpose of the timer and igniter plug mechanism 148, previously referred to, is to establish electrical connections between the components carried by the missile and fire control apparatus of the ship. Fig. 7 illustrates this mechanism in retracted position so that the rammer car can clear it during its reciprocation and Fig. 8 illustrates it in its extended position with the missile ready to be launched. Figs. 26 to 28 illustrate the mechanism in extended position in greater detail. The mechanism comprises a plug housing 362 supported for movement by a lever arm 364 pivotally connected at its lower end to the housing and similarly connected at its upper end to a bracket 366 affixed to the launcher housing, this arm having a lever portion 368 pivotally connected to piston rod 370 forming a portion of actuating cylinder 372. A pair of rigidly connected guide arms 374 are similarly pivoted at their lower and upper ends so that the arms, bracket and plug housing form a parallelogram linkage. The plug housing is provided with a pair of multiple prong timer plugs 376 and an igniter plug 378 which mate with corresponding sockets (not shown) recessed in the rear face of the rear launching lug 380. A tubular dowel pin 382 is adapted to enter a corresponding aperture (not shown) in the launching lug to ensure alignment of the plug housing as it mates with the launcher lug. The housing is also provided with an air supply conduit 384 which terminates in nozzles 386 which supply a blast of dry air onto the electrical connections to free them of moisture just prior to making connections. The timer and igniter plugs and air supply conduit are connected by flexible cables 388 and a flexible conduit 390 to the launcher housing to permit the movement of the plug housing relative to the launcher housing.

Dud jettisoning unit (Figs. 9, 10, 29, 30)

Figure 9:
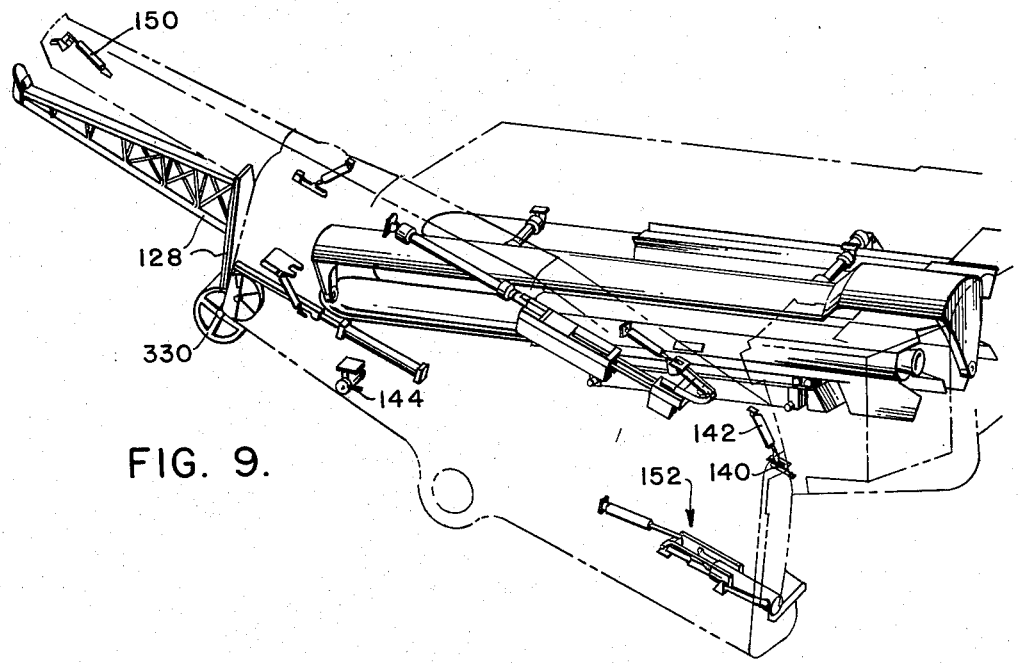
Figure 10:
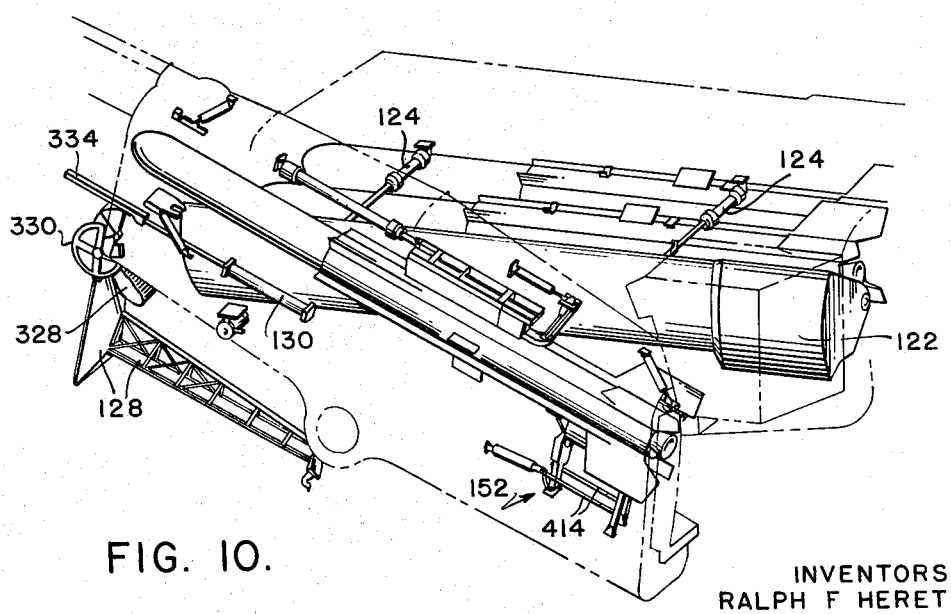
Figure 30:
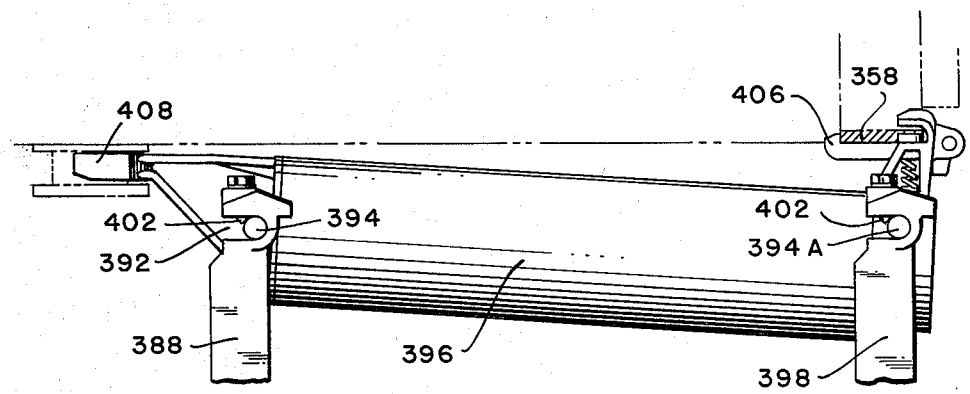
Fig. 30 is a side elevation of a portion of Fig. 29.

The dud jettisoning unit 152, previously referred to, serves the purpose of attaching a rocket motor to the missile for jettisoning it overboard in event it is a dud by reason of malfunctioning of its rocket propulsion motor. Fig. 9 illustrates the position of parts during normal functioning of the launcher with the rocket motor in stowed position and Fig. 10 illustrates the position with the dud jettisoning rocket motor attached to the missile. Figs. 29 and 30 illustrate details of Figs. 9 and 10. This unit comprises a front arm 388 pivoted at its lower end to a bracket 390 affixed to the launcher housing, its upper end being yoke shaped and having forwardly open notches 392 at each side for engaging oppositely radially projecting lugs or pins 394 on the rocket motor 396. Rear arms 398, 400 are similarly pivoted at their lower ends to the launcher housing, their upper ends being similarly notched to receive a pair of rear pins 394A secured to a band 404 encircling the rocket motor. Spring loaded detents 402 are associated with all of the notches which resiliently but releasably engage the pins. Band 404 carries a spring urged latched 406 which latches the motor to the rear ring 358 on the missile. The front end of the motor is provided with a yoke shaped lug 408 which engages the T slotted lower rear lug on the missile. The front arm carries a pair of levers 410 which are linked to similar levers 412 on the rear arms by links 414. A piston rod 416, forming a part of an actuating cylinder 418 is pivotally connected to a lever 420 carried by the front arm. When in stowed position the entire unit is disposed within a compartment in the floor of the launcher housing and protected against blast from the missile by a pair of hinged doors 422 which are spring urged to closed position. When the rocket motor is to be attached to the missile, cylinder 418 is actuated and as the arms and rocket motor swing upwardly and forwardly door lifter rods 424, carried by the arms, raise the doors and the rocket motor moves to the position shown in which it is immovably secured to the missile by lug 408 and latch 406. Reverse movement of the cylinder allows the notches in the upper ends of the arms to disengage from pins 394, 394A and permits the mechanism to return to stowed position beneath the doors. The rocket is then fired by any suitable igniter connections which jettisons the dud missile overboard, after which the unit is reloaded with another rocket motor.

Hydraulic system and controls (Figs. 31 to 34)

Since the turret guns are not fired while a launcher is in use and hence there is no need to hoist gun projectiles into the turret, certain of the conventional ship gun turret equipment is employed during missile launching which thus obviates provision of special additional launcher equipment and effects a dual purpose function for the conventional equipment. The conventional equipment comprises an electrically driven projectile hoist pump 426 which, during use of the gun associated with it, operates a gun projectile hoist power drive 428. The essential alteration of the conventional components is the provision of a transfer valve 430 which may be of any suitable two position type which will direct hydraulic fluid from the projectile hoist pump to either the launcher or to the projectile hoist power drive. Auxiliary apparatus added comprises a filter 432, accumulator 434, unloading valve 436, drain valve 438, pressure line check valve 440, shut off valve 442, and tank line check valve 444. Pressure supply line 446 and return line 448 connect with the various hydraulic actuated components of the launcher. Thus, supply line 446 and return line 448 form a closed circuit in which liquid under pressure may be supplied by the projectile hoist pump by bypassing its normal circuit through the projectile hoist power drive to the launcher when the projectile hoist power drive is not employed for its normal purpose. As will be apparent a like hydraulic power supply is employed for each launcher.

To better understand the control system in its most simplified form, reference is now made to Fig. 32 which illustrates a hydraulic double acting actuator A, the piston of which is connected by a piston rod to an element E, opposite ends of the cylinder being selectively valved to supply line 446 and return line 448 by suitable manually controlled control valve MV. Such devices are conventional and well known and as will be apparent element E may be power moved under control of the valve between limit positions shown in full and dotted lines. In its most simplified form, each cylinder actuator in the system previously described could therefore be considered as being connected to its corresponding actuated instrumentality or element E and under control of a manually actuated control valve. Referring now to Fig. 33, the simplified control just described may be modified by the substitution of a solenoid controlled valve SV for manual valve MV and actuation of the valve be controlled by suitable electrical switches, this type of actuator also being conventional. As illustrated in Figs. 31, 31A this is the preferred type of control wherein each of the actuators is associated with a suitable solenoid controlled valve for supplying it with liquid under pressure to move it between its limits of motion. With this modification it will now be apparent that if all of the solenoid valves are switch connected to suitable electrical control apparatus, such as a rotary drum or disk provided with suitable slip rings, the sequence of actions of the various actuators may be placed under automatic control to function in a predetermined sequence. In the preferred form of the invention, however, the control is semi-automatic, requiring certain manual intervention. The electrical system actually employed is highly complex and a complete illustration and description of same would becloud rather than illuminate the more important features of the invention hence a highly simplified form has been illustrated. Referring again to Fig. 33 a limit switch S is also illustrated which element E will close when it moves to the dotted line position and this switch may complete a circuit to a solenoid valve $SV_1$ associated with a sequentially operated actuator $A_1$. This principle of operation is illustrated in Fig. 14 wherein the completion of operation 12 actuates a switch which starts operation 13, the completion of which starts operation 14, etc. through operation 17. At the completion of operation 17 it is desired to simultaneously start operations 18 and 19 which, as will be apparent, requires two limit switches (or a parallel circuit) rather than one switch. Similarly, operations 2, 4 and 5 start simultaneously under control of separate circuits, operation 2 energizing the start of operation 3 which terminates with the latching of the door, while operation 4 is independent of a succeeding operation and operation 5 energizes operations 6 and 7 which terminate without energizing a succeeding operation. Manual controls, such as at operations 8, 9, 11, 20, 23 and 26 initiate these operations. Operation 9 differs slightly from the other manually initiated operations in that the manual operation may occur prior to termination of operation 8 and serve as an enabling circuit for automatic operation of operation 9 at the termination of operation 8. Where a plurality of automatic operations occur in sequence, each dependent upon completion of a previous operation, such as operations 12 through 19, it is to be understood that each operation may be individually controlled independent of completion of its preceding operation to thus permit servicing, testing, replenishment of missiles, dud jettisoning or other operations which may be necessary in the operation of the various mechanisms. Fig. 14 does not illustrate the operation of the dud jettisoning device since the operation of this device is not within the normal sequence. Its operation may be considered as being under manual control as illustrated in Fig. 32 or 33. After attaching the dud jettisoning motor to the missile under manual control and retracting its actuating mechanism, operation 26 would be initiated under manual control and the dud jettisoning motor would then be fired under manual control.

Replenishment

Assuming the magazine is empty and the last missile has been fired from the launcher, the launcher is elevated under manual control to 25° elevation and stowed thereat with the stow pin. The rammer is retracted and the gun mount rotated to a desired position wherein the launcher rail may be aligned with missile handling equipment (not shown) which will carry a missile through the rear opening in the launcher housing along a replenishment rail aligned with the launcher rail. The lower rear missile lug is then captured between stops 260, 262 and the missile is carried forward in the launching rail after which the handling equipment is detached from the launcher. The launcher is then depressed to 0° elevation and the missile is ready for transfer into the magazine, this operation being known as "strikedown" which is essentially a reverse action of indexing, the operation being under manual control. In this sequence the rammer moves to its retracted position, the indexer is extended, the rammer is uncoupled, the rear missile stop is lifted by a rammer uncoupling and rear stop release cylinder 280 (Fig. 31A) and the missile is latched to the indexer which is then retracted, moving the missile one module toward the magazine. This procedure is repeated until the magazine is again replenished and, as will be apparent, after replenishment one missile may remain in the launcher guide. While this is the most convenient manner of replenishing the magazine and launchers, it will be apparent that by rendering the top plates of magazine 126 removable, the missiles could be replenished in the magazine at their central adjacent ends and indexed in a direction toward their respective launchers.

The term "gun turret" as employed in the above specification and appended claims is to be understood as having its more common meaning of a "gun mount" wherein only the supporting portion for the guns adjacent the ship deck is rotatable but may also include the more technical definition wherein a rotatable turret structure extends into the hull of the ship.

It is to be understood, also, that the guns are of the conventional stabilized type wherein the gun elevating mechanism maintains the gun firing axes at a predetermined elevation above the horizontal as the ship rolls. When the launchers are used with the particular missile described in the identified copending application this angle will remain at approximately 45° to the horizontal. As will be apparent, however, any other angle may be chosen which is within the range of the elevation angles of the guns.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

We claim:

1. A shipboard launcher for rocket propelled missiles, comprising; a gun turret rotatable about a vertical axis and having a gun bodily carried thereby, means for rotating said gun about a first horizontal axis passing through and rotatable with said turret, whereby the gun firing axis may be disposed at a desired elevation, a missile guide supported by said turret for bodily rotation therewith about said vertical axis and for rotation about a second horizontal axis parallel to said first horizontal axis, said launcher guide having a longitudinal reference axis along which a missile is adapted to be launched, means interconnecting said launcher guide and said gun constructed and arranged to rotate said launcher guide about said second horizontal axis in response to rotation of said gun about said first horizontal axis and maintain said reference axis parallel with said gun firing axis, a missile magazine disposed on the top of said turret and at one side of said launcher guide including indexing means for supporting a plurality of missiles arranged in parallel spaced relation in a substantially horizontal plane and for simultaneously moving all of said missiles one missile spacing toward said launcher guide, whereby the missile most closely adjacent the launcher guide may be delivered to the launcher guide, and transfer means for transferring said last named missile from the indexing means to a launching position along said reference axis.

2. A launcher in accordance with claim 1 wherein the means interconnecting the launcher guide and the gun comprises disconnectible means for permitting the gun to be elevated independent of the launcher guide.

3. A launcher in accordance with claim 2 wherein the disconnectible means includes a parallelogram linkage, one link of which comprises the gun slide of the gun.

4. A launcher in accordance with claim 1 including a plurality of hydraulically operated actuators for actuating movable components associated with said indexing means and transfer means, hydraulic supply means for actuating said actuators comprising a projectile hoist pump for normally operating a projectile power hoist operatively associated with the turret, and valve transfer means for bypassing liquid from the projectile power hoist pump to said actuators, whereby the projectile hoist pump may selectively operate either the projectile power hoist or said actuators.

5. A launcher in accordance with claim 1 wherein said indexing means comprises a rectilinearly reciprocable carriage having a pair of parallel spaced latch rods bodily and rotatably carried thereby, a second pair of latch rods rotatably carried by fixed structure on the turret, each being disposed parallel and adjacent a latch rod carried by the carriage, spaced collar means carried by both pairs of latch rods for engaging axially spaced lugs disposed on the lower side of each missile, the construction and arrangement being such that said lugs are locked to the fixed structure in one position of rotation of the latch rods and are locked to the carriage for movement therewith in another position of rotation of the latch rods, and means for simultaneously rotating all latch rods between the two named positions.

6. A launcher in accordance with claim 1 wherein said transfer means comprises a rectilinearly reciprocable rammer car adapted to engage a pair of axially spaced front and rear missile launching lugs disposed at the upper side of a missile and transfer the missile from said indexing means to a launching position along said reference axis.

7. A launcher in accordance with claim 6 wherein said rammer car comprises a front car and a rear car, means interconnecting said cars in a manner such that in one position said cars are spaced apart and said front car is spaced from a launching rail carried by said launcher guide, said cars each having a launching rail forming an axially aligned continuation of said first named launching rail, means carried by said rear car for releasably securing it to the rear missile launching lug, and means for moving said rear car into abutting relation with said front car and said front car into abutting relation with a rear end of said first named launching rail to thereby provide uninterrupted guide means along which a missile may be launched.

8. A shipboard launcher for rocket propelled missiles for use with a gun turret as an attachment thereto, said gun turret being rotatable about a vertical axis and having a gun bodily carried thereby and means for rotating said gun about a first horizontal axis passing through and rotatable with said turret, whereby the gun firing axis may be disposed at a desired elevation, a missile launcher guide adapted to be supported by said turret for bodily rotation therewith about said vertical axis and for rotation about a second horizontal axis parallel to said first horizontal axis, said launcher guide having a longitudinal reference axis along which a missile is adapted to be launched, means interconnecting said launcher guide and said gun constructed and arranged to rotate said launcher guide about said second horizontal axis in response to rotation of said gun about said first horizontal axis and maintain said reference axis parallel with said gun firing axis, a missile magazine adapted to be secured on top of said turret and at one side of said launcher guide including indexing means for supporting a plurality of missiles arranged in parallel spaced relation in a substantially horizontal plane and for simultaneously moving all of said missiles one missile spacing toward said launcher guide, whereby the missile most closely adjacent the launcher guide may be delivered to the launcher guide, and transfer means for transferring said last named missile from the indexing means to a launching position along said reference axis.

9. A launcher in accordance with claim 8 including a movable door adapted to provide communication between said launcher guide and said magazine when in open position and for preventing rocket blast from a missile being launched from entering said magazine when in closed position, and means for opening and closing said door.

10. A launcher in accordance with claim 8 wherein said launcher guide comprises a launcher door movably carried by said guide adapted, when in closed position, to close a forward end of said guide and prevent sea spray or the like from entering same, and, when in an open position, to permit launching of a missile along said guide, and means for opening and closing said door.

11. A launcher in accordance with claim 8 including a plurality of movable snubbers adapted, in one position, to engage and provide support to a missile disposed in launching position and adapted in another position to disengage from the missile to permit its launching, and means for moving said snubbers between the two named positions.

12. A launcher in accordance with claim 8 including a movable timer and igniter mechanism adapted, in one position, to permit missiles to be indexed and transferred to said launcher guide and to thereafter be moved to a second position releasably engaging a portion of a missile to be launched, and means for moving said mechanism between the two named positions.

13. A launcher in accordance with claim 8 wherein said launcher guide includes a housing, a compartment adjacent said housing containing a rocket motor for jettisoning a dud missile disposed within the housing, movable door means normally closing communications between said housing and compartment to prevent missile blast from entering said compartment, and means for opening said door means and for transporting said rocket motor to a position affixed to a missile disposed in the housing.

References Cited in the file of this patent

UNITED STATES PATENTS 2,866,384     Hersh _____ Dec. 30, 1958

OTHER REFERENCES

Disclosure of 4.5 inch rocket launcher T-34 on page 186, and of the 7.2 inch rocket launcher M-17 on pages 192, 193 of "Weapons of World War," Barnes, copyrighted in 1947.